United States Patent [19]
McHugh et al.

[11] 3,896,612
[45] July 29, 1975

[54] FRUIT HARVESTER

[75] Inventors: Carl Manning McHugh; Byron Kenneth Webb; Clarence Elam Hood, Jr., all of Clemson, S.C.

[73] Assignee: Research Corporation, New York, N.Y.

[22] Filed: Nov. 14, 1973

[21] Appl. No.: 415,733

[52] U.S. Cl. ............................................... 56/329
[51] Int. Cl. ............................................ A01g 19/08
[58] Field of Search ............. 56/328 R, 328 TS, 329

[56] References Cited
UNITED STATES PATENTS

| | | | |
|---|---|---|---|
| 1,626,068 | 4/1927 | Bartlett | 56/328 TS |
| 2,714,281 | 8/1955 | Steele | 56/329 |
| 3,145,521 | 8/1964 | Herbst | 56/329 |
| 3,338,040 | 8/1967 | Shipley, Jr. | 56/328 TS |
| 3,474,609 | 10/1969 | Alberti et al. | 56/329 |
| 3,477,215 | 11/1969 | Herbst | 56/328 R |
| 3,541,773 | 11/1970 | Cate | 56/329 |
| 3,772,862 | 11/1973 | Wilson | 56/27.5 |

*Primary Examiner*—Russell R. Kinsey
*Attorney, Agent, or Firm*—Harold L. Stowell

[57] ABSTRACT

A fruit tree harvester having a fruit catching and collecting bed that is composed of a half frame and a pair of quarter frames. The quarter frames overlie the half frame in a transport position of the harvester and extend outwardly on either side of a fruit tree trunk, close about the tree trunk and then pitch upwardly in an operative position of the harvester. The harvester may support a shaker mechanism and a box or bin with novel filling means. The harvester is designed for operation by a single operator and the motive power for the harvester is preferably provided by a farm tractor.

6 Claims, 26 Drawing Figures

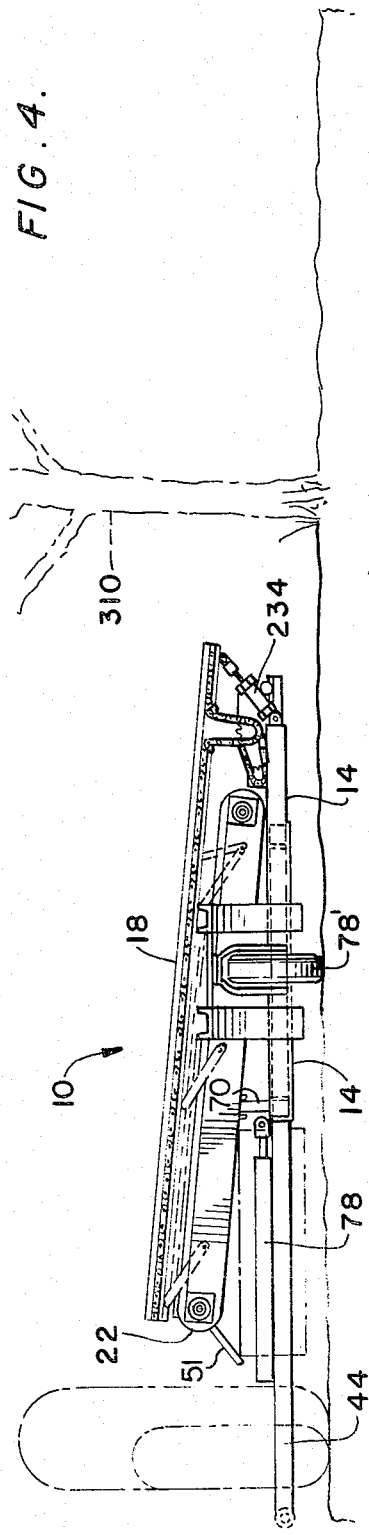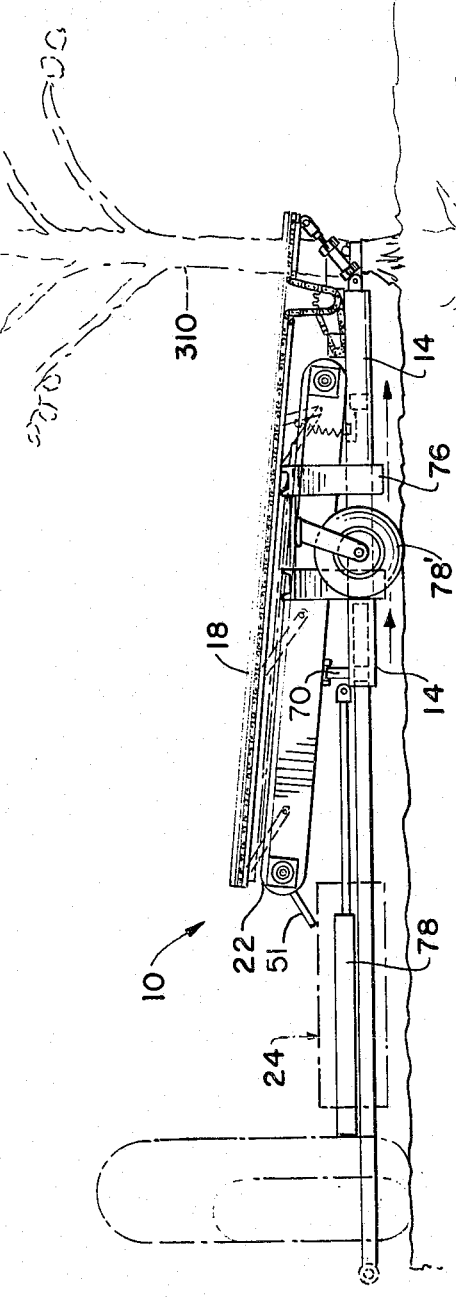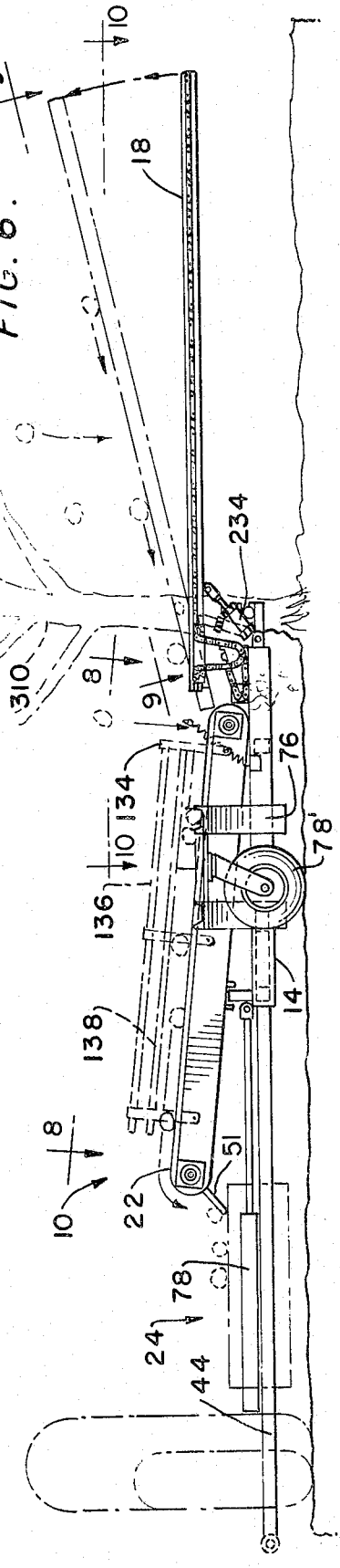

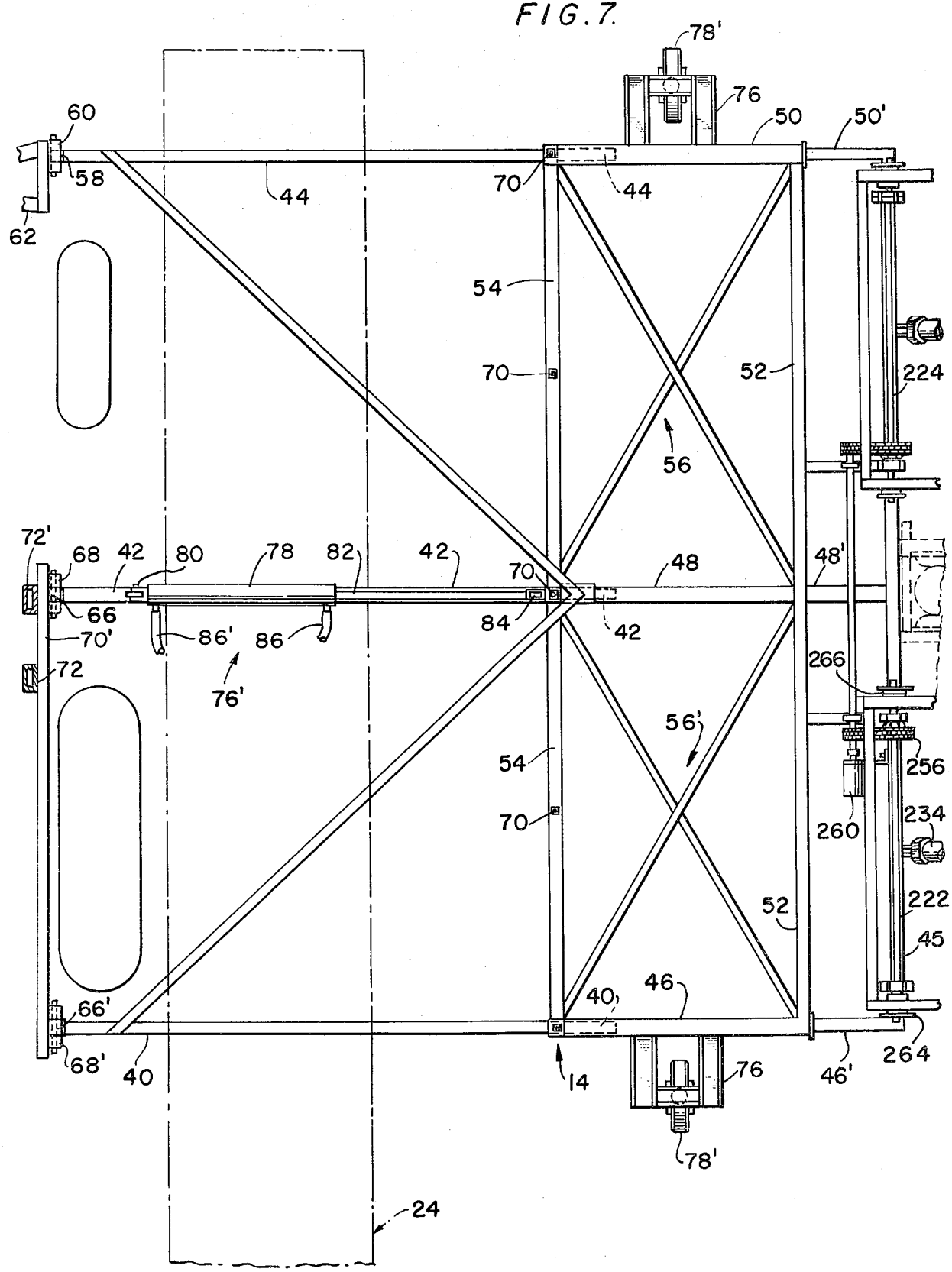

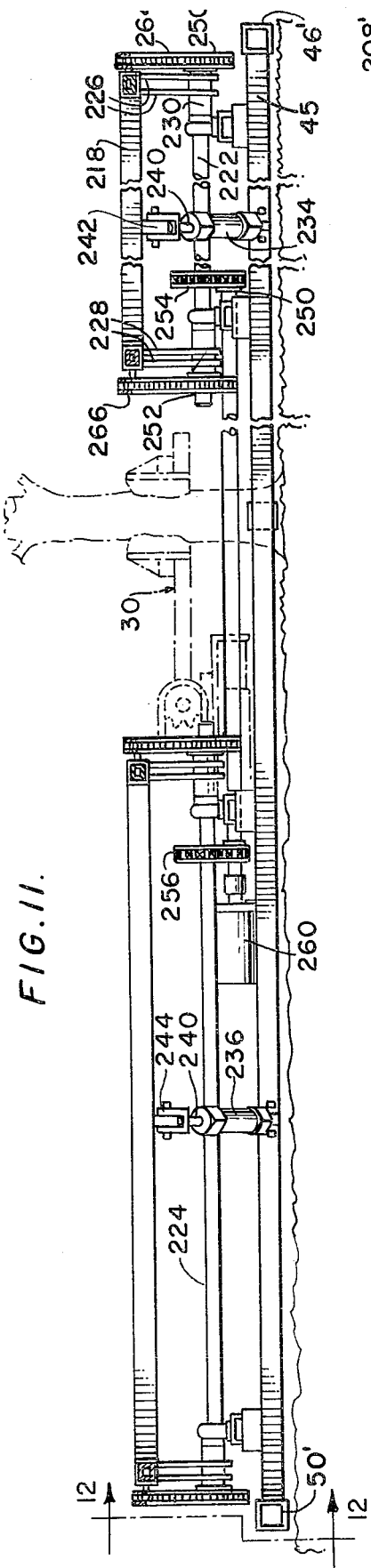
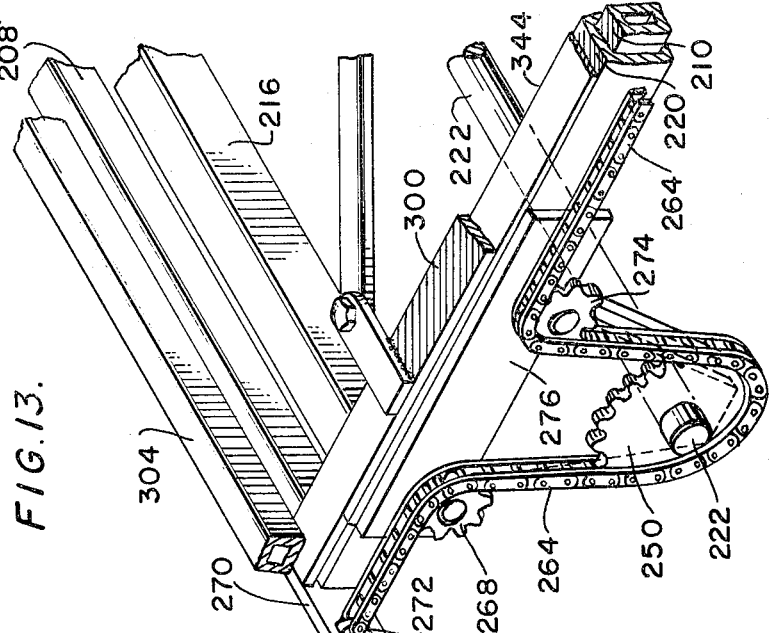
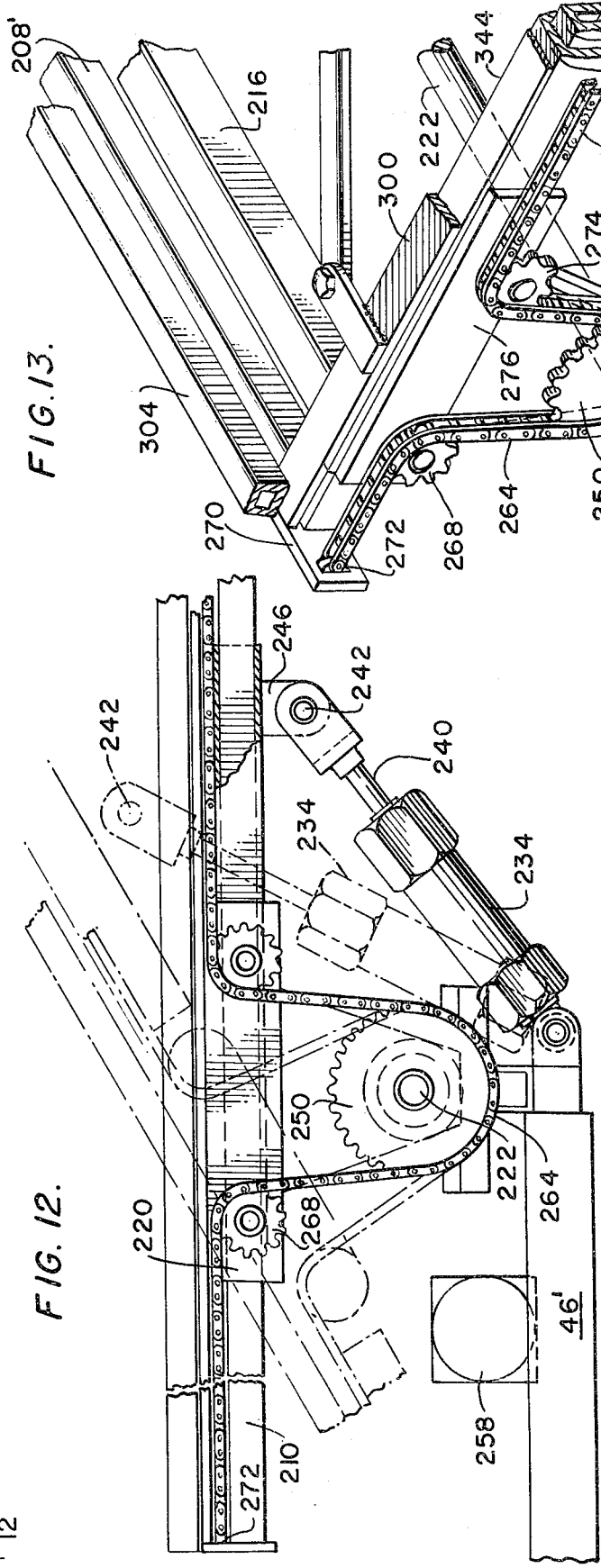
FIG. 11.
FIG. 13.
FIG. 12.

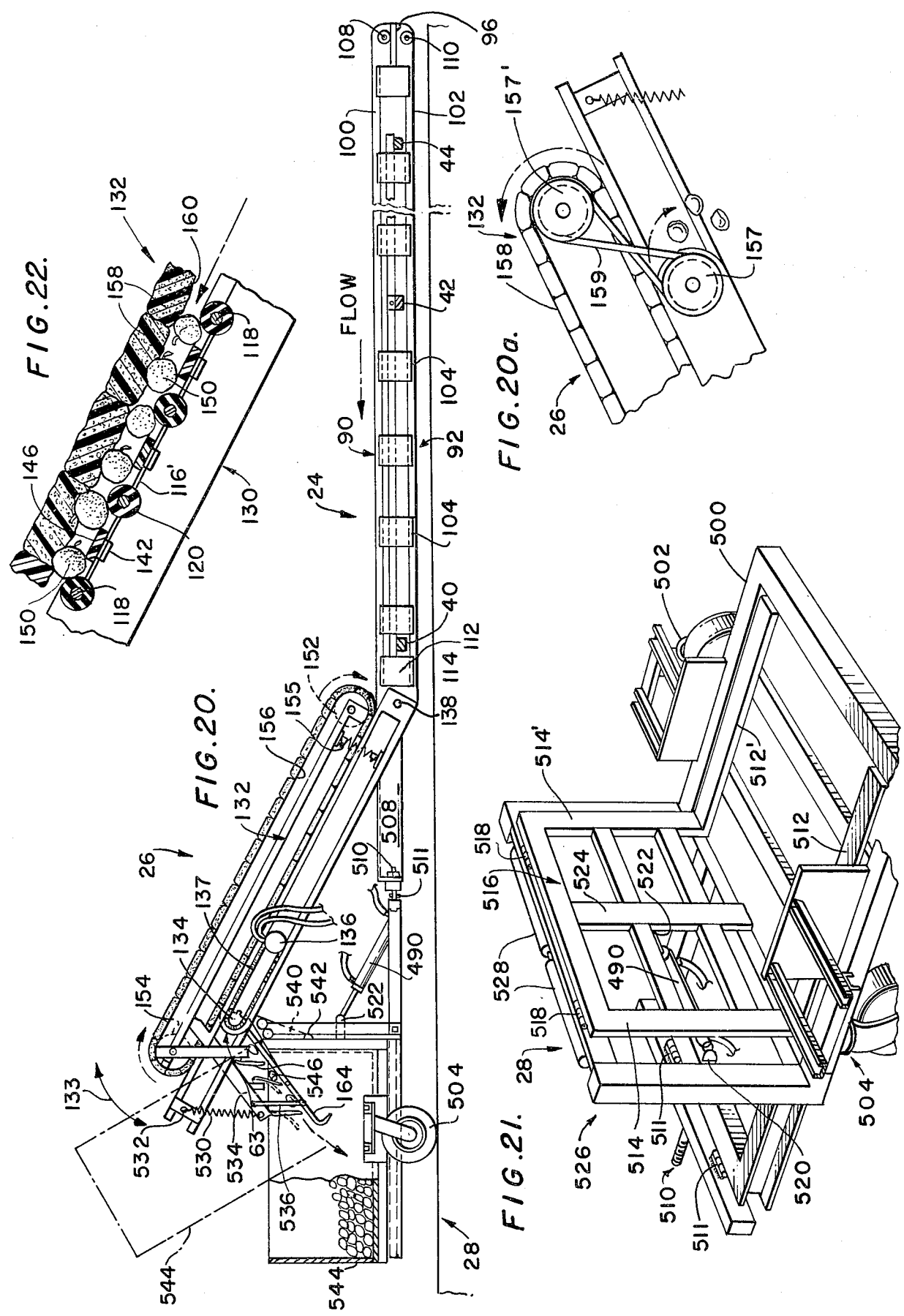

FRUIT HARVESTER

BACKGROUND OF THE INVENTION

1. Field of the Invention

The present invention generally appertains to new and useful improvements in agricultural machinery and apparatus and more particularly relates to a new and useful general purpose fruit tree harvesting machine.

2. Description of the Prior Art

Even at the present time, fruit, such as peaches and apples, is still being harvested by hand, and this is in spite of and in the light of the existence in the prior art of mechanical harvesters. Such mechanical harvesters have not proven particularly commercially feasible and practically satisfactory because they lack orchard mobility, require trailer transportation from one orchard to another, require more than a minimum of one or two operators, are very complicated from a construction and operation standpoint, and lack adaptability to terrain conditions.

Therefore, due to the absence of a practical mechanical fruit harvester, peaches and apples, for example, are still being harvested by hand, particularly fruit grown on small semi-dwarf trees. Thus, harvest costs remain higher than any other costs of production. In addition, the cost of manual picking labor is increasing every year while the labor supply is continually dwindling and management problems are increasing. Many growers, even small (family) growers, will be forced out of business unless the harvesting operation can be successfully mechanized.

SUMMARY OF THE INVENTION

The present invention presents an improved harvester for tree bearing fruit and, in particular, apples and peaches which minimizes fruit damage; minimizes time and effort required for transporting the machine between orchards; which is highly versatile and may be operated effectively on flat as well as hilly or mountainous terrain; may be operated by a single operator; and has a low time for mechanical harvesting whereby a tree may be stripped of its harvest and loaded into bulk bins in a relatively short time.

In general, in a preferred embodiment of the machine it is caster wheel supported and maneuvered by a farm tractor and each of the mechanical movements thereof is brought about by hydraulic motors either of the rotary or linear type or both and the power and controls therefor are supported by the tractor in a position whereby the tractor driver has full and complete control of all functioning of the harvester including positioning and actuation of an integral tree shaking mechanism.

BRIEF DESCRIPTION OF THE DRAWINGS

FIG. 4 is a side elevational view illustrating the frames of the harvester nested as illustrated in FIG. 1;

FIG. 5 is a side elevational view similar to that shown in FIG. 4 with the frames moved partially outwardly toward the tree to be harvested;

FIG. 6 is a side elevational view showing the harvester in full lines with the quarter frame fully horizontally extended and in broken lines in the harvesting position;

FIG. 7 is a plan view of the main frame of the harvester.

FIG. 11 is a vertical sectional view showing certain of the linear and rotary hydraulic motors;

FIG. 12 is a view on line 12—12 of FIG. 11;

FIG. 13 is a fragmentary perspective view of a portion of the extender drive assembly for the quarter frames;

FIG. 20 is a detailed view of the collecting and packing conveyor with a fruit bin illustrated in two of its plural positions;

FIG. 20a is an enlarged detailed view of the synchronized drive for a portion of the conveyor system;

FIG. 21 is a perspective view of the castered bin carrier shown in FIG. 20;

FIG. 22 is a detailed enlarged sectional view through the fruit discharge conveyor;

DESCRIPTION OF THE PREFERRED EMBODIMENTS

Figure 1:
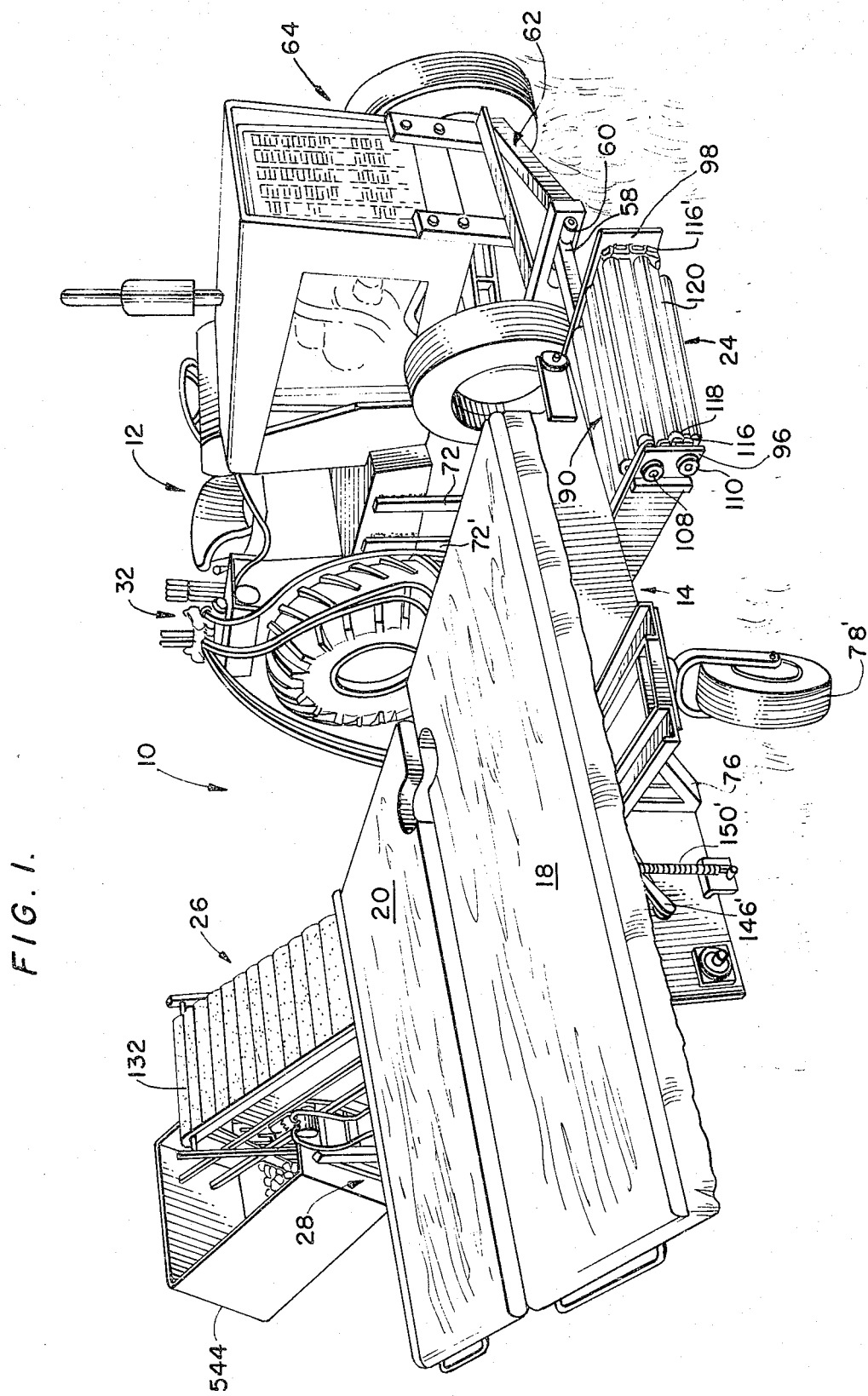
FIG. 1 is a perspective view of the machine of the present invention in its transport position and coupled to a transporting tractor.
Figure 2:
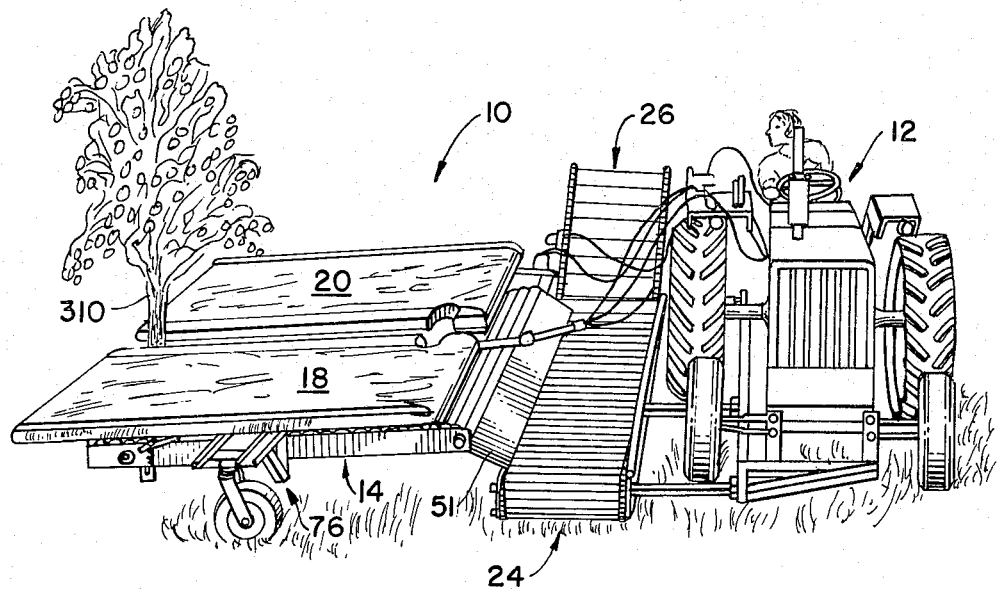
FIG. 2 is a perspective view illustrating the first phase of its operation with the tree to be harvested properly aligned with the apparatus and the final packing conveyor uncovered.
Figure 3:
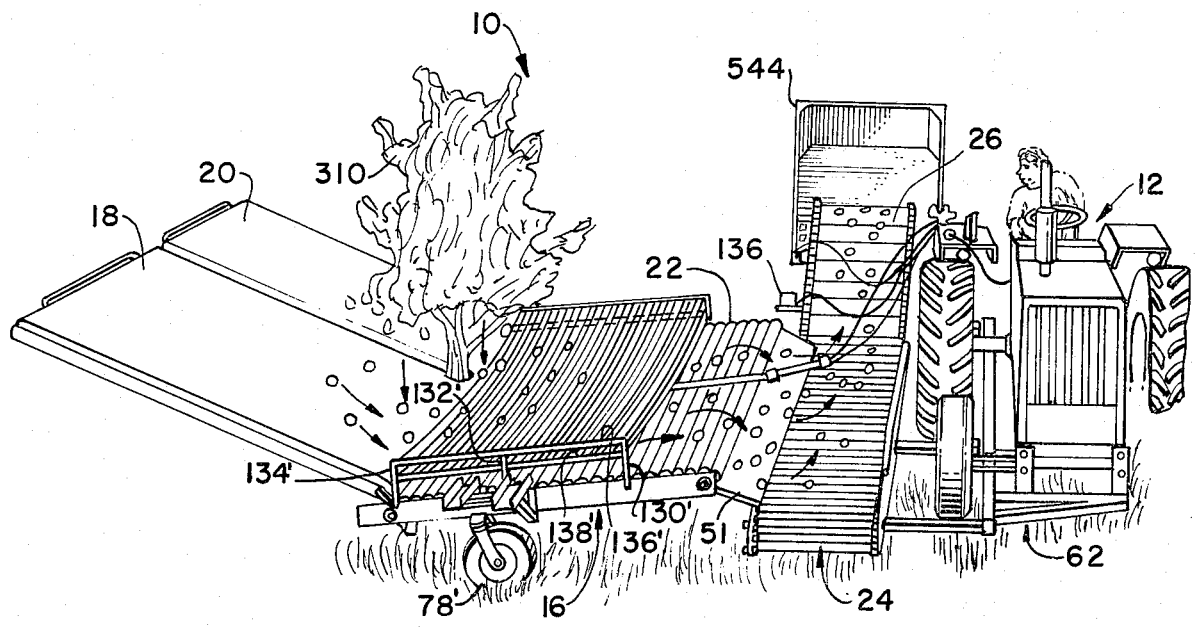
FIG. 3 is a view illustrating the harvester in operation with fruit being shaken from the tree, collected and binned.
Figure 8:
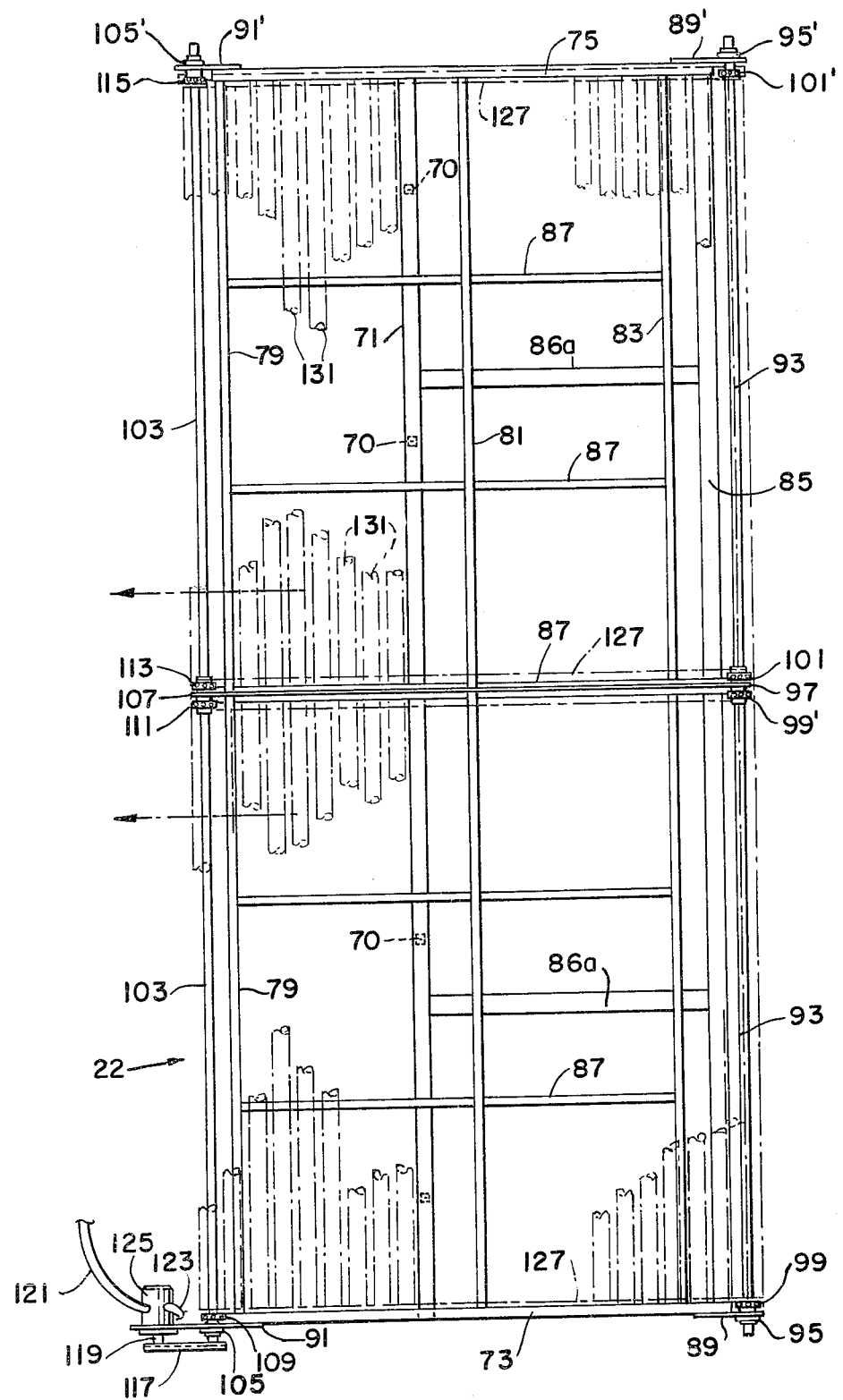
FIG. 8 is a plan view, substantially on line 8—8 of FIG. 6, of the line conveyor frame with portions of the covering removed for clarity.

Referring to the drawings, and in particular FIGS. 1, 2 and 3, 10 generally designates an embodiment of the improved harvester associated with a prime mover illustrated as a farm tractor 12. The harvester includes a main frame 14 which includes a first half catcher frame 16 and a pair of quarter frames 18 and 20; a line conveyor for harvested fruit 22, a combined cross conveyor 24 and discharge conveyor 26, FIG. 20; fruit bin and carrier 28, FIGS. 20 and 21; tree shaker mechanism 30, FIGS. 14 through 19; and control and drive mechanism 32, FIG. 25. Each of these primary mechanisms will be described in detail hereinafter.

MAIN FRAME

Referring particularly to FIGS. 1 through 7, the main frame 14 consists in general of three spaced frame elements 40, 42 and 44, about which are slidable complementary frame elements 46, 48 and 50, respectively. Frame elements 46, 48 and 50 are rigidly maintained in their spaced relationship by lateral beam members 52 and 54 and suitable cross-bracing such as generally designated 56 and 56'. Movable with frame elements 46, 48 and 50 are complementary extension elements 46', 48' and 50' which are welded to lateral beam 52. The other or extended ends of frame elements 46', 48' and 50' are welded to lateral frame element 45.

Frame element 44 has one of its ends provided with a hinge half 58 which mates with hinge half 60 carried by a support frame 62 welded or otherwise secured to the front end 64 of the tractor 12 as more clearly shown in FIGS. 1 and 7. The other end of frame element 44 is slidable in frame 50. Frame elements 40 and 42 each terminate at one end in a hinge half 66 and 66' which cooperate with hinge halves 68 and 68' secured to lateral frame member 70' secured to the side of the tractor 12 by mounting brackets 72 and 72' again as more clearly shown in FIGS. 1 and 7. The other ends of frame elements 42 and 40 slide in frames 48 and 46 as shown.

Frame elements 46 and 50 have welded thereto caster wheels carrying bracket means 76 each of which supports a caster wheel 78'. The pair of caster wheels 78' together with the front and rear hinge connections 58, 60 and 66, 68, 66' and 68' articulatively support the harvester from the ground via the caster wheels and from the tractor 12 via the three hinge connections.

Frame elements 40, 42 and 44 are telescoped relative to their complementary frame elements 46, 48 and 50 by a single hydraulic ram assembly 76' consisting of a ram cylinder 78, pin connected as at 80 to frame element 42 and a ram piston rod 82 pin connected to frame elements 48 and 54 at 84. Suitable hydraulic lines 86 and 86' connect the ram to a source of pressure fluid as to be more fully described hereinafter in reference to FIG. 25 of the drawings.

CROSS AND DISCHARGE CONVEYOR MEANS

The combined cross and discharge conveyor means 24–26 is best shown in FIG. 20 and is supported intermediate its upper flight 90 and its lower flight 92 by the three frame elements 40, 42 and 44 and the conveyor includes a pair of side frames 96 and 98 at each end and longitudinal runners 100 at the top and 102 at the bottom rigidly connected by a plurality of plates 104. The side frames 96 and 98 carry a pair of idler pulleys 108 and 110 at the tractor's forward end and a driven pulley 134 at the discharge end which pulley terminates at one end in a sprocket which is driven by hydraulic motor 136, via chain 137, which is connected into the hydraulic control system to be more fully described in reference to FIG. 25. The conveyor is composed of a pair of chains 116 and 116', FIG. 1, between which are supported a plurality of spaced rods 118 having resilient coverings 120, FIG. 22, such as foam elastomeric material to thereby reduce fruit damage during the conveying thereof. The spacing between the plurality of rods 118 forming the main surface of the conveyor means is partly filled by cross members 142 having resilient top surfaces 146 and the space between adjacent resilient covers 120 and 146 is such as to retain fruit of the desired minimum size but to permit the passage of trash and leaves therethrough.

The two portions 24 and 26 of the combined cross and discharge conveyor means are pin-joined at 138 so that end 63 of the discharge portion of the conveyor means may pivot as shown by directional arrow 133 relative to the cross conveyor portion 24 of the system.

The discharge conveyor portion 26 functions in conjunction with a synchronously driven endless flight conveyor 132.

The upper conveyor 132 includes an idler pulley 152 and a driven pulley 154 about which a belt 156 runs.

A compression spring 155 supports the non-discharge end of the upper conveyor 132 from the upper surface of the discharge conveyor means 26.

Driven pulley 154 is driven from the motor driven pulley 134 of the lower conveyor and as shown in FIG. 20a the shafts of pulleys 134 and 154 each have secured thereto belt pulleys 157 and 157', respectively, about which a crossed belt 159 is trained. Since belt pulleys 157 and 157' and conveyor pulleys 134 and 154 are of the same effective diameters both the upper and lower conveyor flights travel at the same speed or velocity whereby fruit 150 is not damaged by rolling in its sandwiched position between the pair of conveyor belts.

The belt 156 of the upper conveyor has secured thereto a plurality of foam elastomer members 158. The outer surfaces 160 of the foam members 158 run in relatively closely spaced mating engagement with the upper flight of conveyor 26 whereby the fruit 150 is sandwiched between such surface 160 and the elastomeric elements 120 and 146 to prevent run-back of the fruit. Fruit from the discharge conveyor assembly 24–26 is discharged onto a filler or discharge pan 164 to be more fully described hereinafter.

ONE HALF CATCHER FRAME AND LINE CONVEYOR

The main frame 14 supports the one half catcher frame 16 which in turn carries the line conveyor 22. The support therefor comprises a plurality of upstanding posts 70 welded to transverse member 54 and to a complemental frame member 71 supported between side plates 73 and 75 which make up a portion of the half catcher frame as more clearly shown in FIGS. 3 through 8. In addition to the side frames 73 and 75 and the transverse frame member 71, the one half frame also includes transverse frame elements 79, 81, 83, and 85 and a plurality of cross frame members designated 87 all of which are welded or otherwise secured to the other frame elements into a rigid construction.

The side frame elements 73 and 75 carry bearing plates 89 and 89' and 91 and 91'. Between bearing plates 89 and 89' is mounted a shaft 93 supported in bearings 95, 95' and 97. The shaft 93 has fixed thereto sprockets 99, 99', 101 and 101'.

Figure 23:
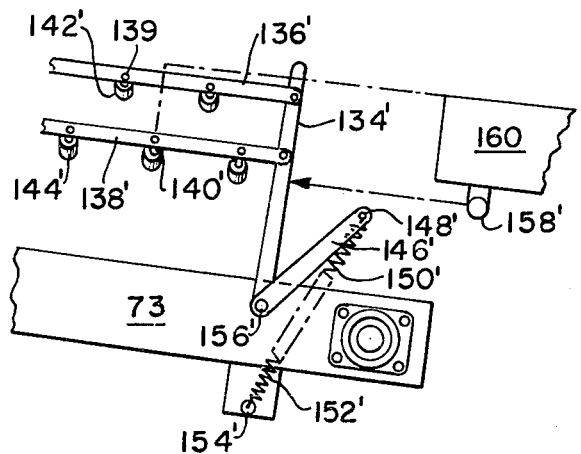
FIG. 23 is a fragmentary side view of the means for operating the fruit decelleration elements.
Figure 24:
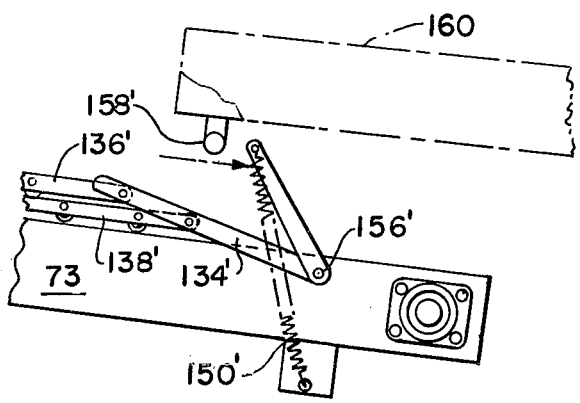
FIG. 24 is a view like FIG. 23 with the fruit decelleration elements in the folded position.

The other pair of bearing plates 91 and 91' support conveyor shaft 103 in bearings 105, 105' and 107. Secured to the shaft 103 are sprockets 109, 111, 113 and 115. Further, the extended end of shaft 103, adjacent plate member 91, has a drive sprocket secured thereto which meshes with a drive chain 117 which also meshes with a motor shaft carried sprocket 119 forming a part of rotary hydraulic motor 125 connected to the source of hydraulic fluid via conduits 121 and 123 as to be more fully described hereinafter in reference to FIG. 25 of the drawings. Conveyor support chains travel between the pairs of sprockets 99, 109; 99', 111; 101, 113 and 101', 115. Each of the chains is designated 127. These chains, as more clearly shown in FIG. 10, have secured thereto a plurality of spaced rods 129 which rods are covered with foam rubber or the like 131, again to reduce fruit damage during conveying thereof. The spacing of the rods 129 and the thickness of the foam rubber is such that the minimum size fruit to be conveyed is larger than said spacing while trash and the like is permitted to fall between the spaced rods onto a sheet metal pan, then swept back and discharged at the tree end of the conveyor. As is more apparent from, for example, FIGS. 3 and 6, the line conveyor 22 discharges the fruit 150 on to foam rubber flap 51, then on to the cross conveyor-discharge conveyor system 24–26. Each of the side frame members 73 and 75 also pivotally mounts three arm members 130', 132' and 134', FIGS. 3 and 23, which arm members are articulatively connected to first and second cross arm members 136' and 138'. Between each pair of structural members 136'–138' extends a plurality of ropes 139 in the top layer and 140' in the lower layer. The ropes 139 and 140' are covered with sponge or foam rubber or plastic 142' and 144', respectively. The spacing between the ropes in any layer is about 5 inches and with such an arrangement the majority of the fruit falling in the zone of the half frame strike one or more deceleration members prior to engaging the surface of the line conveyor positioned therebelow.

In order to reduce the height of the machine when it is in the transport position such as shown in FIGS. 1 and 4, the deceleration assembly is collapsible as shown in FIGS. 1 through 6, 23 and 24. Opposite pairs of upstanding lever arms 134' (closest to the center of the machine when the harvester is in its open fruit harvesting position) have secured thereto an actuating arm 146'. Each actuating arm has its extended end 148' connected to one end of a toggle spring 150'. The opposite end 152' of the toggle spring is connected to frame member 73 or 75 (as the case may be) at 154' with the connections 154' being vertically above pivotal connections 156' connecting the lever arms 134' and actuating arms 146' to the frames 73 or 75. Thus, when the decelerator frame is in its erect position toggle springs 150' assist in maintaining the frame in said position. However, when the decellerator frame is in the collapsed position, FIG. 24, the toggle springs 150' move to the opposite side of pivotal connections 156' thus maintaining the frame in the collapsed position. The frame is raised and lowered by means of operating striker lugs 158' carried by the main side members 300–300' of the quarter catch frames 18 and 20 which will be more fully described hereinafter.

THE QUARTER CATCH FRAMES 18 AND 20

Referring particularly to FIGS. 1 and 4 through 13 as hereinbefore set forth, the harvester includes a pair of side by side quarter catch frames which rest over the half catch frame in the transport position of the apparatus and extend outwardly together and upwardly into their operative positions. Each of the quarter frames 18 and 20 comprises a pair of frames; a lower longitudinally movable frame 200 and 202, respectively, and an overlying laterally shiftable frame 204 and 206, respectively. The quarter frames, comprising frames 200, 204 and 202 and 206, are identical in form, and operation and construction thereof will be only primarily described in reference to quarter frame 20.

The underlying longitudinally extending and rising main frame 202 is rectangular in configuration and composed of main, end frame elements 208 and 208', main side frame members 210 and 212 and intermediate frame member 214. The side frames members 210 and 212 are each of square tubular stock as more clearly shown in FIG. 13 and are slidably mounted in short tubular housings 220 cross-connected by frame elements 216 and 218. The tubular housings are connected to a pair of cross shafts 222 and 224 for frames 20 and 18, respectively, by two pairs of spaced arm members 226 and 228 for frame 20 which arms are rigidly welded at one end to the tubular housing 220 and at the opposite end rigidly welded to sleeve bearings 230 and 232, respectively mounted for rotation on shaft 222. Further, the connection between the main frame of the vehicle and the quarter frames includes a hydraulic ram 234 for frame 20 and 236 for frame 18. The lower end of each of the rams is connected to a cross arm 45 of the main frame underlying the one half catcher frame.

The piston rods 240 of each of the hydraulic rams 234 and 236 are pivotally connected as at 242 and 244 to an ear 246 depending from each of the cross members 218 which extend between and are rigidly connected to one end of the pairs of tubular housings or sleeves 220 as more clearly shown in FIGS. 11, 12 and 13. With the pivot arms 226 and 228 and the hydraulic ram 234 for frame 20 the frame is tiltable as shown in full and dotted lines in FIG. 6 of the drawing. Power for the pair of hydraulic rams or linear motors 234 and 236 is from the main hydraulic pump, to be more fully described in reference to FIG. 25 of the drawings.

Figure 25:
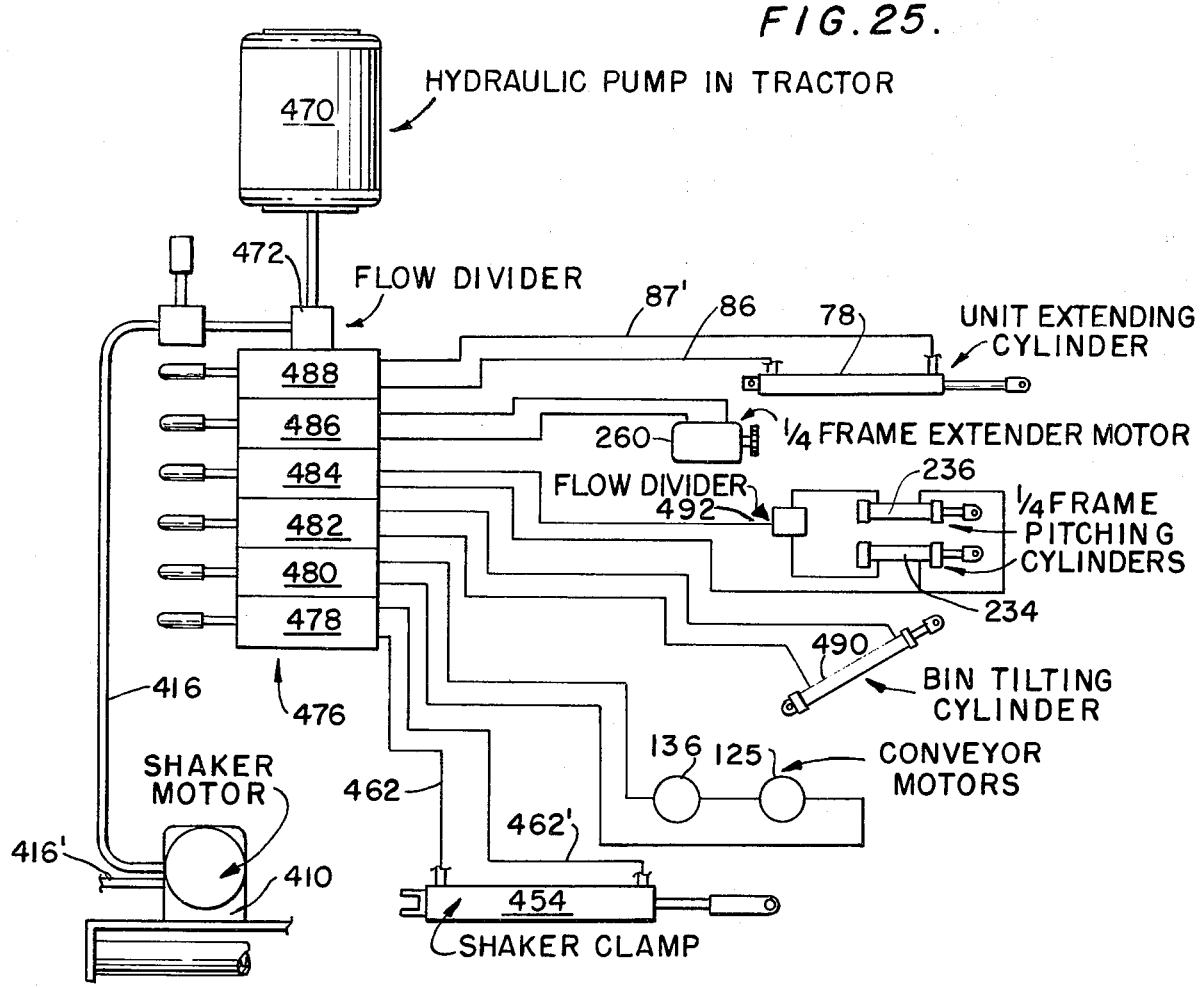
FIG. 25 is a schematic hydraulic control diagram for the apparatus shown in the drawings.

The outboard ends of the shaft 222 rigidly mount drive sprockets 250 and 252 which sprockets are driven by a further sprocket 254 secured to the shaft 222 about which a drive chain 256 is trained and the drive chain 256 is also trained about a sprocket 258 secured to the output shaft of hydraulic motor 260. The hydraulic motor 260 is also connected to the main hydraulic system for the harvester as shown in FIG. 25. Along each of the side frame members 210 and 212 is an extender drive chain 264 and 266. Drive chain 264 is trained about sprocket 250 while drive chain 266 is trained about its drive sprocket 252. One end of drive chain 264 is trained about an idler pulley 268 carried at one end of the tubular housing 220 and then rigidly connected to a plate 270 secured, such as by welding, to cross frame member 208' as at 272. The other end of the chain is trained about an idler sprocket 274 also mounted for rotation to plate 276 welded to the tubular housing 220 and extends forwardly to attach to forward cross frame member 208 as at 278. The other chain is similarly connected to the opposite side of the quarter frame. From the foregoing it will be seen that as the sprocket 250 is rotated in either direction, the frame member 210 and the entire frame is slid within the tubular housing 220 by either pulling on chain connection 278 to retract the frame or pulling on chain connection 272 to extend the frame. As hereinbefore described, each of the quarter frames 18 and 20 is of similar construction and each is driven from the single hydraulic motor 260 as more clearly shown in FIG. 11 of the drawing.

Figure 9:
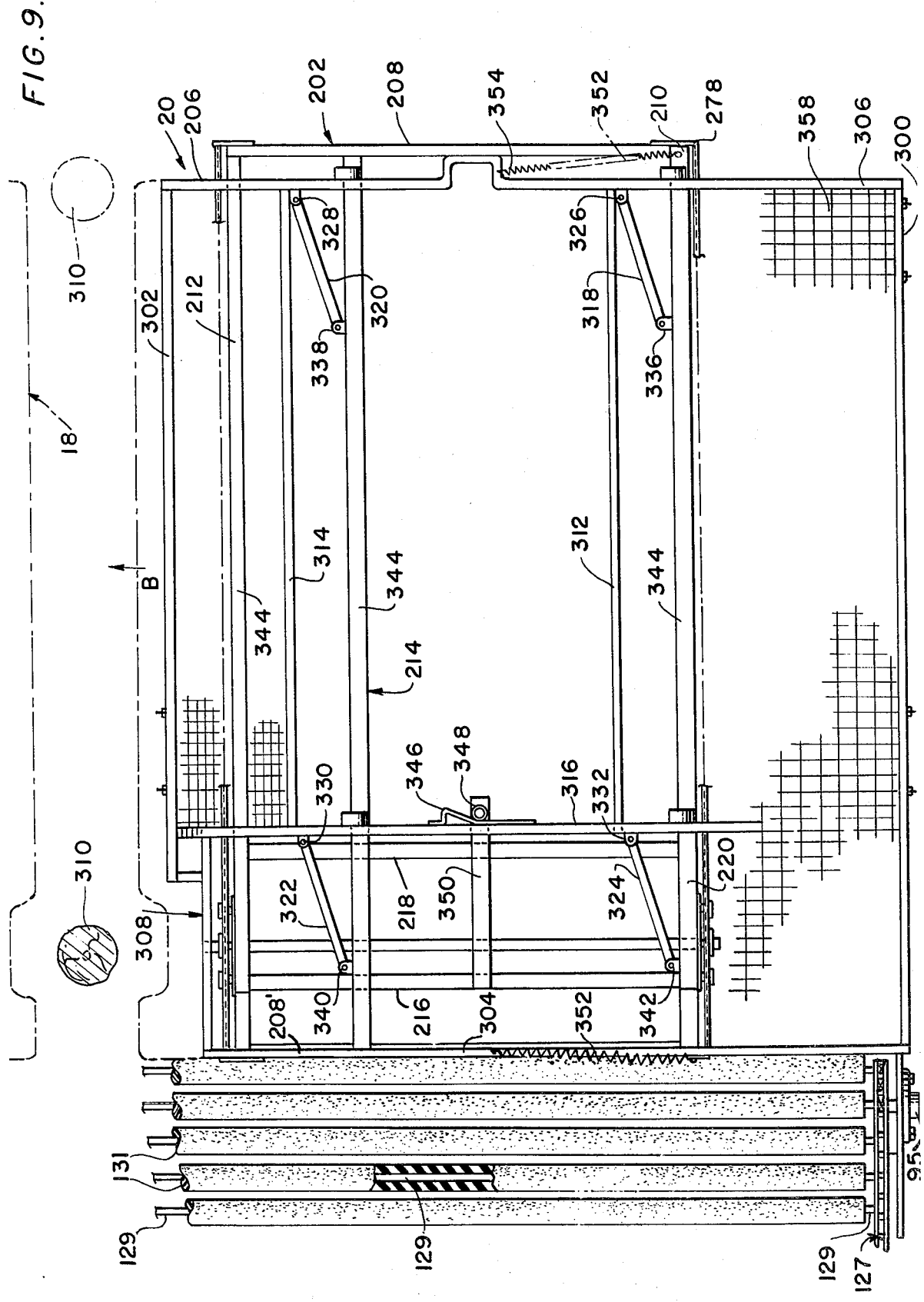
FIG. 9 is a plan view, substantially on line 9—9 of FIG. 6, of one of the quarter catch frames in open position with portions broken away.
Figure 10:
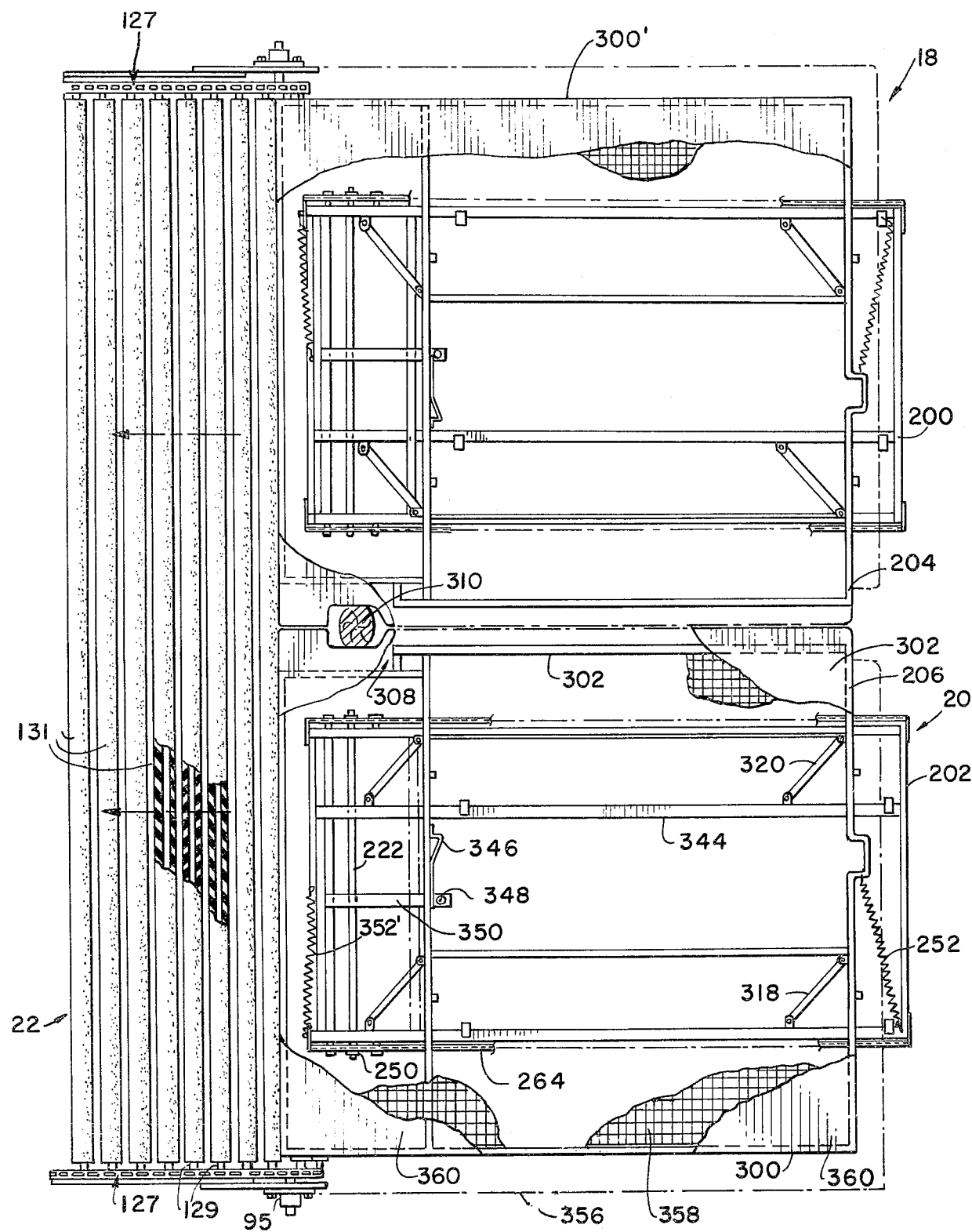
FIG. 10 is a plan view, substantially on line 10—10 of FIG. 6, of the pair of quarter frames in operative position about a tree to be harvested with portions broken away for clarity.

Referring now primarily to FIGS. 9 and 10, the overlying and laterally shiftable top frame 206 of quarter frame 20 is composed of side frame members 300 and 302 and end frame members 304 and 306. It will be noted that side frame member 302 is jogged inwardly at 308 to provide a space to accommodate the trunk 310 of the trees to be harvested. The top catch frame 206 includes interior frame members 312 and 314 and a cross frame member 316.

The top frame member 206 is connected to the lower frame 208 via four frame shifting links 318, 320, 322 and 324. Each of the shifting links is pivotally connected at one end to the top frame member at 326, 328, 330 and 334 for links 318, 320, 322 and 324, respectively.

As more clearly shown in FIG. 13, an oak or the like runner 344 is attached to the lower surface of each of the lower frame members 210, 214 and 212 to provide smooth sliding surfaces for the upper frame. The means for bringing about the lateral shifting of the upper frame is a cam member 346 secured to transverse frame member 316 which engages a cam roller 348 secured to a structural member 350 welded to cross members 216 and 218 connected to the sleeves 220 associated with the lower frame. Thus, as the lower frame is extended carrying with it the top frame when the cam surface 346 engages the cam roller 348 the top frame member is caused to shift in the direction of directional arrow B. Return of the top frame member is brought about by a pair of return springs 352 and 352'. One end of spring 352 is secured to return spring bracket 354 and the opposite end is anchored to the most forward end of transverse frame member 210 of lower frame 208. Spring 352' is connected between frame elements 316 and 210. The amount of lateral shifting of the top frame member is illustrated by the broken line 356, FIG. 10 of the drawings. The entire top frame 206 is closed in with wire mesh 358 2 inches by 4 inches on centers and overlying the wire mesh is a relatively thick foam plastic padding 360 which in turn may be covered with a woven synthetic fabric such as nylon sheeting to protect the foam plastic and to stabilize its shape. It has been found that the wire mesh, the plastic padding and the nylon overcoat provide a sufficient cushion for the fruit, shaken from the trees, striking the sloping surface of the quarter frames as more clearly shown, for example, in FIGS. 3 and 6 of the drawings.

TREE SHAKER MECHANISM

Figure 17:
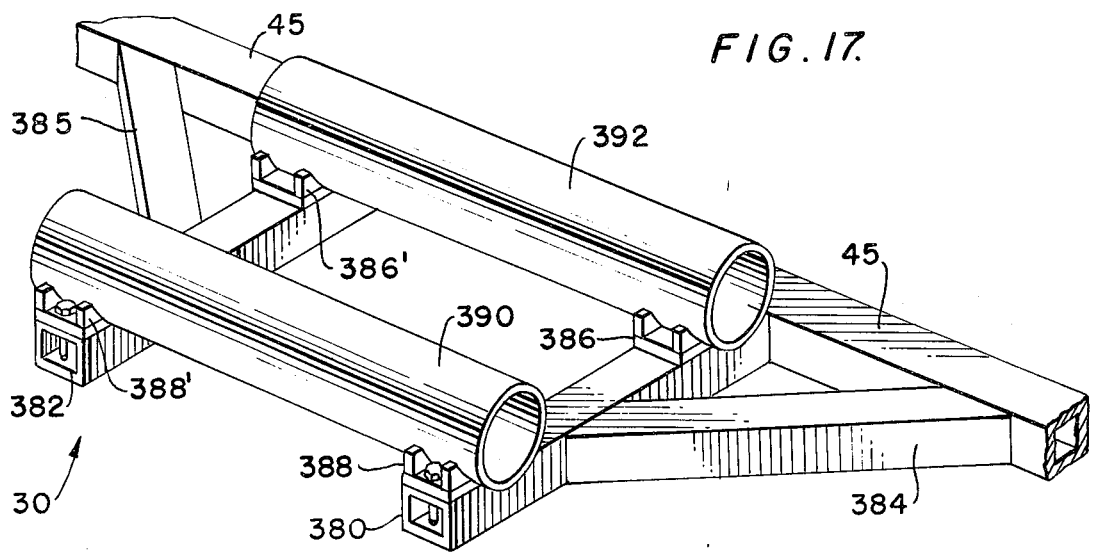
FIG. 17 is a detailed perspective view of a portion of the shaker assembly mount.

Referring particularly to FIGS. 7 and 14 through 19, the novel tree shaking mechanism 30 is supported from end cross beam 45 of the main frame of the harvester which beam, as hereinbefore described, also has attached thereto the tilting cylinders for the quarter frame and other drive mechanisms described in reference to, for example, FIGS. 11 through 13. Beam 45 has welded thereto a pair of frame members 380 and 382 which frame members are braced by tubular elements 384 and 385 as shown in FIG. 17.

Frame members 380 and 382 each mount two pairs of saddles 386 and 386' and 388 and 388'. Saddles 388 and 388' have secured thereto a tubular bearing member 390, while saddles 386 and 386' have secured thereto a tubular bearing 392 which, as to be more fully described hereinafter, provide a sliding support for the shaker mechanism. Mounted within tubular bearing 390 and within tubular bearing 392 are tubular support members having a length approximately twice as long as their complementary bearings 390 and 392 as more clearly shown in FIG. 18. End plates 404 and 404' are welded to the ends of the tubular support members 400 and 402 and the end plates 404 and 404' have welded therebetween a pair of top plates 406 and 406' which primarily mount the drive and eccentric mechanism for the tree shaker.

Figure 14:
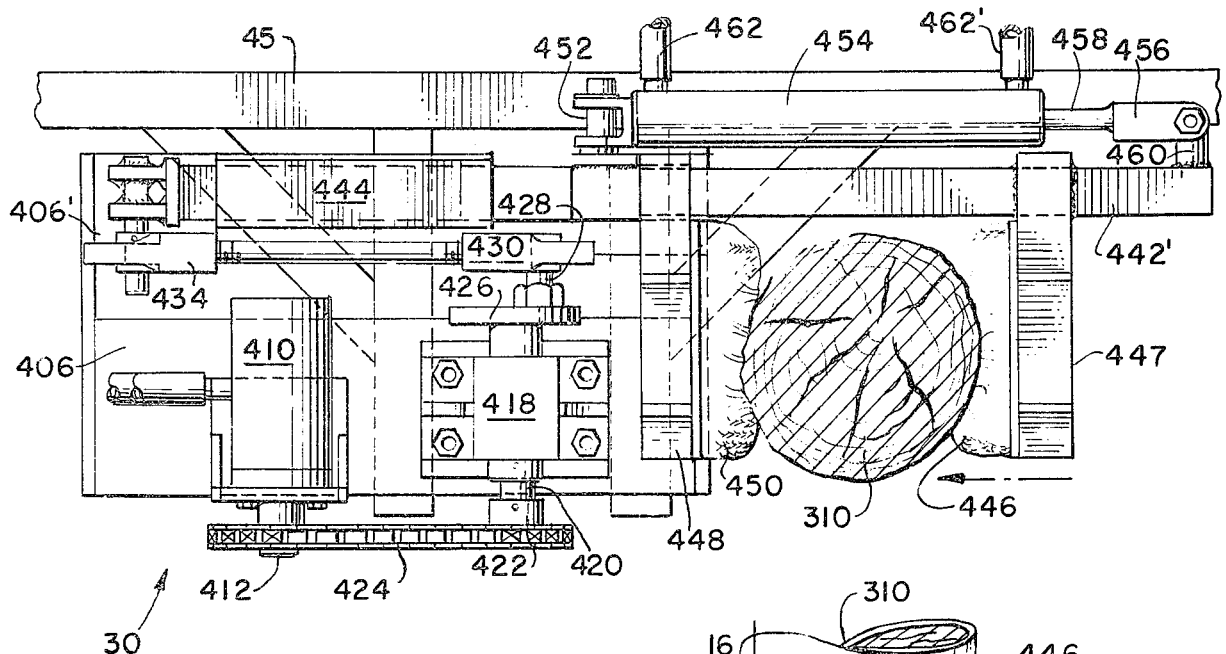
FIG. 14 is a fragmentary partial sectional, top plan view of the shaker assembly about a tree to be harvested.
Figure 15:
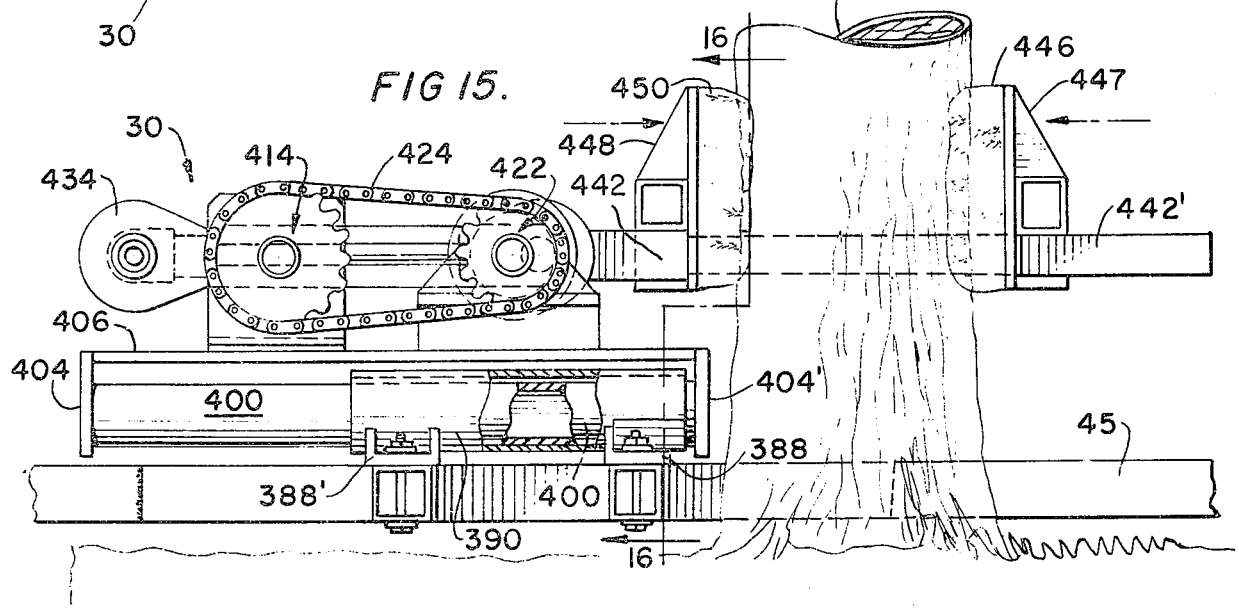
FIG. 15 is a front elevational view of the mechanism shown in FIG. 14.
Figure 16:
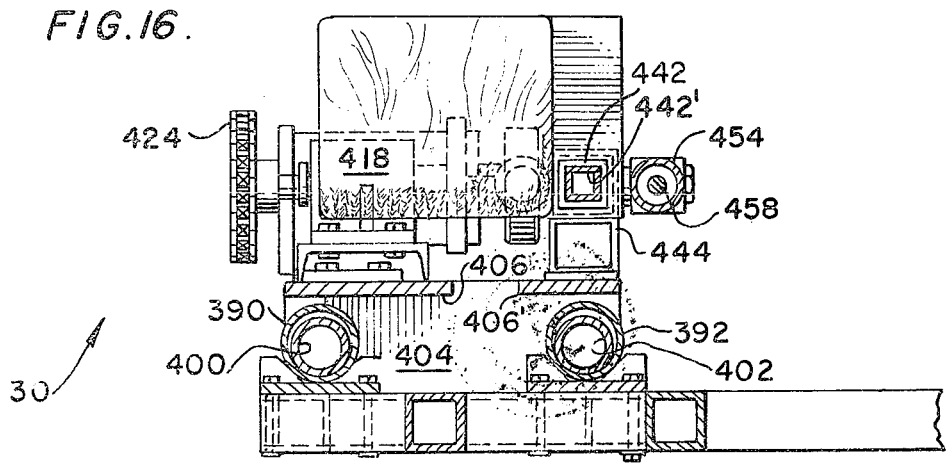
FIG. 16 is a vertical sectional view on line 16—16 of FIG. 15.

Referring now to FIGS. 14 and 15, the shaker mechanism per se includes a rotary hydraulic motor 410 having an output shaft 412 to which is secured a sprocket 414. Pressure fluid from the hydraulic pump, FIG. 25, is directed to and from the hydraulic motor 410 via conduits 416 and 416'. A bearing member 418 also mounted to plate 406 has a shaft 420 extending therethrough. The outboard end of shaft 420 mounts a sprocket 422 and a drive chain 424 extends between sprockets 414 and 422 whereby upon rotation of the motor 410 shaft 420 is caused to rotate. The opposite end of shaft 420 mounts a disc 426 and eccentric pin 428 more clearly shown in FIG. 19 of the drawing. Eccentric pin 428 receives one end 430 of connecting rod 432. The other end 434 of the connecting rod 432 has its pin 436 journalled in a spaced bearing element 438 secured to the end 440 of the shaker shaft of the shaker mechanism generally designated 442, FIG. 19. The bearings at the ends of the connecting rod 432 are preferably of the self-aligning type.

A portion of the shaker shaft 442 is slidably mounted in a hollow bearing element 444 which is mounted to top plate 406', again as more clearly shown in FIGS. 14 and 15. It will be seen that with the eccentric pin 428 driving the crank arm 432 the motion thereof is converted to straight line reciprocating motion of the shaker shaft 442. The shaker shaft 442 has rigidly secured at its extended end a first clamp jaw 448, the internal surface of which mounts a resilient pad 450 to reduce to a minimum bruising of the tree trunk 310. The second clamping jaw 447 is adjustably mounted on square shaft 442' which telescopes into square shaker shaft 442 and the clamping face thereof also includes a padding element 446. The non-adjustable clamp jaw 448 is pin connected via pin 452 to the rearward end of a hydraulic ram or cylinder 454. The extended end 456 of the cylinder's piston rod 458 is pin connected to a bracket 460 welded to the most extended end of the telescopic shaker shaft 442'. Hydraulic fluid via conduits 462 and 462' connect the clamping cylinder 454 to the source of pressure fluid, as to be more fully described in reference to FIG. 25.

OPERATION OF THE TREE SHAKER

Figure 18:
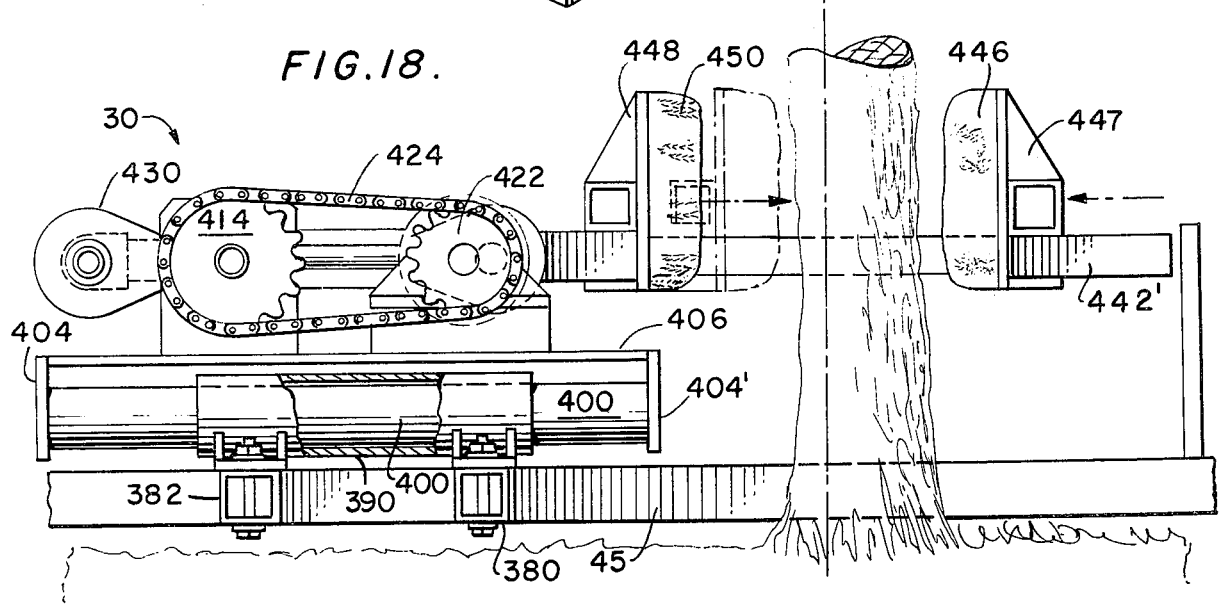
FIG. 18 is an action view, similar to that shown in FIG. 15, illustrating how the shaker mechanism may shift to accommodate an off-centered tree trunk.
Figure 19:
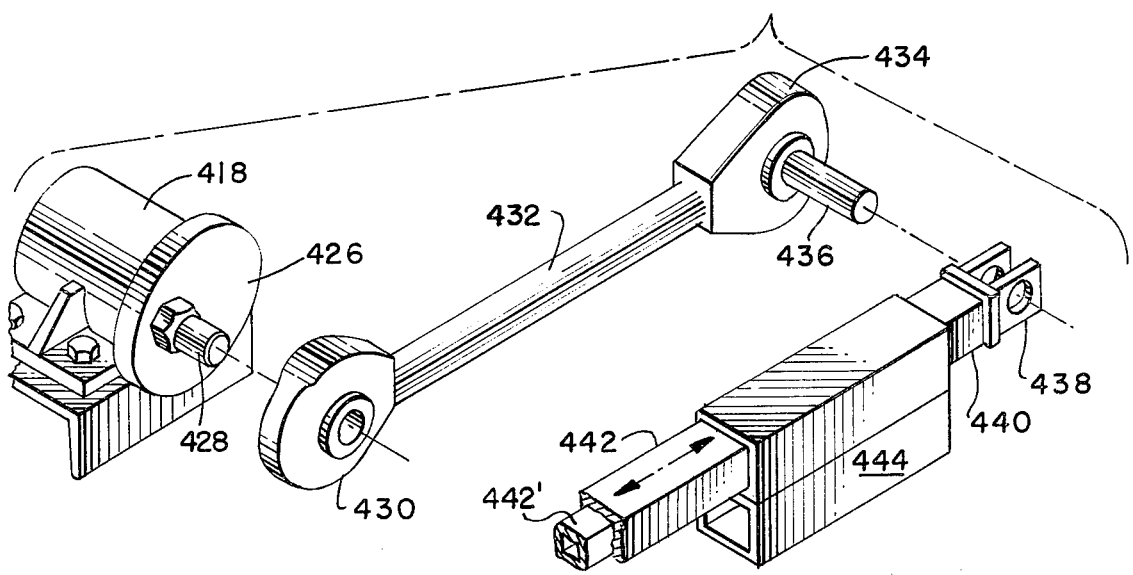
FIG. 19 is an exploded perspective view of the eccentric drive means for the shaker assembly.

Upon extension of the main frame from the position shown in FIG. 4 to that shown in FIG. 5 with the clamping hydraulic ram 454 in the position such that the clamping jaws 447 and 448 are fully extended, the clamping jaws are positioned about the tree to be harvested in the manner shown in FIG. 18. After the quarter frames have been extended and elevated, the hydraulic ram of the clamping cylinder is energized urging the two clamping jaws into engagement with the trunk of the tree. Thereafter, actuation of the hydraulic rotary motor 410 causes the two clamping jaws to reciprocate with the reciprocation of the rod 442 thereby shaking the tree. In the event the tree is not positively centered between the pair of opened clamping jaws 447 and 448 as is shown in FIG. 18 upon closing of the clamping jaws by actuation of the clamping cylinder 454 the entire shaker mechanism is caused to slide on the pair of tubular bearings 390 and 392 so that limited off-centering positioning of the harvester does not place unnecessary stress upon the tree. After an off-center tree has had its fruit removed it will be noted that the shaking mechanism will return substantially to its centered cradle position as the clamping jaws are opened.

The foregoing described action allows the operator a tolerance when positioning the harvester. When shaking the tree, it has been found desirable to shake in bursts rather than continuously to prevent overloading of the various conveyors. The speed of the shaker motor may also be varied by varying the tractor engine speed and the length of the stroke that may be varied at the eccentric 426. Use of eccentrics from 1 to 1½ or 2 inches with the motor operating up to 900 rpm's has been found to produce adequate results.

When the shaker is operating, the entire stroke of the shaker is never transmitted to the trunk unless the tree is very small and very flexible. The stroke is proportioned between the shaker unit and the trunk as when shaking action is produced the shaker unit is being displaced as well as the tree trunk. However, substantially no shaking action is produced in the harvester due to the sliding action between the shaker mount and the slides as hereinbefore described.

HYDRAULIC CONTROL MEANS

Referring to FIG. 25, mover. The hydraulic pump 470 is driven by the tractor prime mover. The output of the pump 470 goes to a flow divider 472 with a portion of the divided flow passing via conduit 416 and control valve 474 to the hydraulic shaker motor 410. Exhaust fluid from the shaker motor flows via conduit 416' to a sump, not shown, for the hydraulic pump.

The remainder of the output from the hydraulic pump from the flow divider 472 passes to a main control block generally designated 476 including controls 478 for the shaker clamp, 480 for the conveyor motors 125 and 136; 482 for a bin tilting cylinder 490 to be described hereinafter; 484 for the pair of quarter frame pitching cylinders 236 and 234 after the flow passes through a further flow divider 492; 486 for the one half frame extender motor 460 and control 488 for the main frame extending cylinder 78. Each of these controls is mounted on the side of the tractor whereby the tractor operator may completely control the operation of the harvester without moving from the driver's seat.

While the entire mechanism has been described employing pressure fluid actuators, it will be apparent to those skilled in the art that the hydraulic system may be replaced by electric motors connected to a generator driven by the prime mover or part of the motors may be electric and part hydraulic.

FRUIT BIN AND CARRIER

Referring to FIGS. 1 through 3, 20 and 21, the harvester may include a fruit bin carrier generally designated 28. The carrier comprises a quadrangular frame 500 supported on a pair of caster wheels 502 and 504. The carrier is secured to frame member 508, forming a portion of the framing connecting the harvester to the tractor, by a single bolt connection generally designated 510 and a pair of hinges 511. The single center mounted bolt and the pair of hinge connections permit the bin carrying frame to roll and pitch relative to the harvester per se when the harvester is used on uneven ground.

Mounted on the quadrangular frame 500 is a fork frame consisting of fork elements 512 and 512' which are also associated with a back frame consisting of vertical elements 514, 514' and cross member 516. These elements forming the fork are hinged as at 518 to the main frame 500 of the carriage for movement from the position illustrated in FIG. 21 to a bin tilting position with the bin shown in the broken line position FIG. 20. Tilting of the bin is brought about by hydraulic ram 490 pin connected at 520 to the forward end of the main frame 500 while the ram piston rod 522 is pin connected to a vertical web 524 associated with the fork mechanism. Forwardly of the tilting fork frame is a rigid upstanding frame generally designated 526 which carries cushioning rollers 528 along its upper edge against which rests the underside of a discharge pan 164, shown more clearly in FIG. 20. The discharge pan 164 is pivotally connected to the discharge conveyor and urged in an upwardly direction by a pair of springs 530, one end of each of which is connected to the discharge conveyor frame 532 and to an arm 534 connected by links 536 to the side edges of the pan 164. A control wire 540 is connected to the discharge pan and to the vertical member 524 of the tilting fork of the carriage so that as the hydraulic ram 490 tilts the tilting fork and bin 544 the angle of the discharge chute 164 is also varied. Further, it will be seen in FIG. 20 that a plurality of flexible deceleration flaps 546 are connected from the control member 534 to hang in the path of the upper surface of the discharge chute to reduce the speed of the fruit entering the bin.

In operation of the loading bin, the bin is started in the position shown by the broken lines in FIG. 20. As the bin begins to fill, it is lowered by the hydraulic ram 490 and when the bin is filled it is in the horizontal position as shown in full lines in FIG. 20. By tilting the bin the distance of fall of the harvested fruit from the lower end of the discharge chute to the bottom of the bin or the uppermost layer of fruit is reduced to a minimum again reducing to a minimum fruit spoilage during harvesting.

From the foregoing general description and specific description of various components of the improved harvester, it will be seen that the objects and advantages hereinbefore set forth and others are fully accomplished.

Further, it will be appreciated by those skilled in the art that various modifications may be made in the form of the various components and their assemblage without departing from the scope of the claims of this application.

We claim:

1. A fruit tree harvester comprising a generally quadrangular main frame; a fruit catching and collecting bed carried by said main frame; said catching and collecting bed comprising, a half frame generally coextensive in size to said main frame and attached thereto for limited lateral sliding movement and a pair of quarter frames each extensible laterally in respect to the main frame, each of said quarter frames comprising a bed frame and a catcher bed, said catcher bed of each quarter frame being movable longitudinally in respect to the main frame and the bed frame, means coacting between the main frame and the half frame for laterally moving the half frame and the pair of quarter frames relative to the main frame from a transport position overlying the half frame to an extended outwardly position on either side of a tree to be harvested; further means for moving said pair of quarter frames from the outwardly extended position to a position with the outward edges of the pair of quarter frames pitched upwardly; said means for moving the pair of quarter frames from the transport position to the extended outwardly position includes means for urging the catcher beds longitudinally with respect to their respective bed frames as the quarter frames approach the most extended positions, and means for transporting fruit caught by said half frame and pair of quarter frames to a collection zone.

2. The invention defined in claim 1, wherein said fruit transporting means includes a first conveyor underlying and substantially coextensive with the half frame of said fruit catching and collecting bed.

3. The invention defined in claim 2, including a second conveyor, receiving fruit conveyed by the first conveyor, and transporting said fruit to a collecting zone normal to the direction of conveyance of the first conveyor.

4. The invention defined in claim 3, including a fruit bin, and a wheeled bin-supporting dolly articulatively connected to the harvester said dolly including means for tilting said fruit collecting bin to thereby reduce fruit damage during bin filling.

5. The invention defined in claim 1, including tree shaking mechanism mounted to the main frame between the pair of quarter frames when the quarter frames are in the extended position, means mounting said shaker mechanism is mounted for limited sliding movement relative to the main frame of the harvester, said shaker mechanism including a reciprocating shaker arm connected to a pair of tree engaging clamps wherein the shaker arm reciprocates in a path parallel to the path of sliding movement of the shaker mechanism.

6. In a fruit tree harvesting mechanism including a main frame and tree shaking means mounted thereon wherein said shaker mechanism is mounted for limited sliding movement relative to the main frame of the harvester, said shaker mechanism including a reciprocating shaker arm and a pair of tree engaging clamps mounted thereon, wherein the shaker arm reciprocates in a path parallel to the path of sliding movement of the shaker mechanism.

* * * * *